US009841145B1

(12) United States Patent
Powell et al.

(10) Patent No.: US 9,841,145 B1
(45) Date of Patent: Dec. 12, 2017

(54) AXIAL PIERCING MECHANISM FOR PRESSURIZED GAS CANISTER

(71) Applicant: Sparton Corporation, Schaumburg, IL (US)

(72) Inventors: David J. Powell, Sanford, FL (US); Keith R. Huber, Palm Coast, FL (US); Earl H. Mark, Deleon Springs, FL (US); Taylor J. Durrance, Port Orange, FL (US)

(73) Assignee: Sparton Corporation, Schaumburg, IL (US)

( * ) Notice: Subject to any disclaimer, the term of this patent is extended or adjusted under 35 U.S.C. 154(b) by 0 days.

(21) Appl. No.: 15/334,331

(22) Filed: Oct. 26, 2016

(51) Int. Cl.
*B63B 22/22* (2006.01)
*F17C 7/00* (2006.01)
*F17C 1/00* (2006.01)
*F17C 13/06* (2006.01)
*B63C 9/22* (2006.01)
*F16K 17/40* (2006.01)
*B60C 29/00* (2006.01)

(52) U.S. Cl.
CPC ............... *F17C 7/00* (2013.01); *B63B 22/22* (2013.01); *F17C 1/005* (2013.01); *F17C 13/06* (2013.01); *B63B 2201/18* (2013.01); *B63B 2203/00* (2013.01); *B63C 9/22* (2013.01); *B63C 9/24* (2013.01); *F16K 13/04* (2013.01); *F17C 2201/0109* (2013.01); *F17C 2201/058* (2013.01); *F17C 2205/032* (2013.01); *F17C 2221/013* (2013.01); *F17C 2265/06* (2013.01); *F17C 2270/0126* (2013.01); *F17C 2270/0128* (2013.01); *F17C 2270/0736* (2013.01)

(58) Field of Classification Search
CPC .. B63C 9/22; B63C 9/24; B63B 22/22; F16K 13/04; F17C 1/005; F17C 7/00; F17C 13/06; F17C 2205/032; F17C 2270/0126; F17C 2270/0128
USPC ........... 441/7–9, 92–94, 30; 222/3–5, 80–91, 222/399, 541.1–541.9, 325–327, 333
See application file for complete search history.

(56) References Cited

U.S. PATENT DOCUMENTS 3,602,661 A * 8/1971 Liedberg .................. B63C 9/24
                                                    200/61.05
4,083,187 A * 4/1978 Nagashima ........... F16K 17/403
                                                    137/68.3

(Continued)

*Primary Examiner* — Nicholas J Weiss
*Assistant Examiner* — Andrew P Bainbridge
(74) *Attorney, Agent, or Firm* — Quinn IP Law

(57) ABSTRACT

An axial piercing mechanism for a pressurized gas canister includes a housing, electric motor assembly, pushrod assembly, and lancet. The housing defines one or more radial exhaust ports and coaxial internal cavities. The electric motor assembly and pushrod assembly are disposed in the respective first and second cavities. The pushrod assembly is coupled to the electric motor assembly and is rotatably driven along the longitudinal axis thereby. The lancet is coupled to the pushrod assembly. The housing includes a second end that receives or couples to a sealed end of the pressurized gas canister proximate the lancet such that the electric motor assembly, when energized, causes the pushrod assembly and lancet to translate along the longitudinal axis, pierce a sealed end/diaphragm of the canister, and release pressurized gas through the exhaust port. A system includes the axial piercing mechanism and the pressurized gas canister.

20 Claims, 4 Drawing Sheets

(56) References Cited

U.S. PATENT DOCUMENTS

| | | | | |
|---|---|---|---|---|
| 4,493,664 A * | 1/1985 | Dale | ................... | B63B 22/003 |
| | | | | 222/5 |
| 4,629,436 A * | 12/1986 | Stewart | ................... | B63C 9/155 |
| | | | | 222/5 |
| 4,927,057 A * | 5/1990 | Janko | ................... | B63C 9/24 |
| | | | | 222/23 |
| 5,271,528 A * | 12/1993 | Chien | ................... | F16N 11/08 |
| | | | | 184/38.4 |
| 5,509,576 A * | 4/1996 | Weinheimer | ............ | B63C 9/24 |
| | | | | 222/192 |
| 6,460,481 B1 * | 10/2002 | Young | ................... | A23G 3/28 |
| | | | | 118/14 |
| 7,540,796 B2 * | 6/2009 | Spears | ................... | B63B 22/08 |
| | | | | 441/8 |
| 7,544,111 B2 * | 6/2009 | Isberg | ................... | B63C 9/18 |
| | | | | 222/5 |
| 7,891,309 B2 * | 2/2011 | Driscoll | ................. | B63B 21/24 |
| | | | | 114/230.2 |
| 8,721,379 B2 * | 5/2014 | Becnel | ................... | B63C 9/19 |
| | | | | 222/5 |

* cited by examiner

AXIAL PIERCING MECHANISM FOR PRESSURIZED GAS CANISTER

TECHNICAL FIELD

The present disclosure relates to an axial mechanism for use in piercing a sealed end of a pressurized gas canister.

BACKGROUND

Carbon dioxide, air, and other application-suitable gasses may be compressed to a desired pressure and stored in a sealed canister for later use. Such canisters are typically configured as elongated metal cylinders. The cylinders have a single open end that is securely sealed with a corrosion- and leak-resistant end seal or diaphragm. Piercing of the diaphragm enables the stored gas to be discharged from the canister and used in a wide variety of possible beneficial applications, including inflation, propulsion, manufacturing, and food preparation.

SUMMARY

A low-profile axial piercing mechanism is disclosed herein that is configured to automatically pierce a diaphragm of a pressurized gas canister, e.g., a conventional carbon dioxide ($CO_2$) canister, and to thereafter port the released gas to a connected device. The axial piercing mechanism is "low-profile" in the sense that it is axially compact and coaxially-aligned with the gas canister, i.e., arranged end-to-end with the canister. In some applications the pressurized gas canister may be required sit in storage for many years before use. Subjecting the gas canister to extended storage periods may increase the risk of gas leakage or degradation of pyrotechnic, chemical-based, or stored mechanical energy devices that may be traditionally used for opening the end seal. The disclosed axial piercing mechanism thus enables the pressurized gas canister to remain securely sealed and thereafter stored for extended periods before use.

The axial piercing mechanism may be optionally positioned externally with respect to the device, with the device being the ultimate consumer of the released gas. In different embodiments the axial piercing mechanism may be connected to an external fixed structure such as a bracket or bulkhead fitting, such as within a center section of a multi-section cylindrical outer shell, with the released pressurized gas thereafter ported to the gas-consuming device in various possible ways as set forth herein.

In a particular embodiment, the axial piercing mechanism may include an elongated housing, an electric motor assembly, a pushrod assembly, and a lancet. The housing, which defines one or more exhaust ports extending radially from a longitudinal axis of the housing, further defines coaxial first and second internal cavities. The electric motor assembly is disposed in the first cavity at a first end of the housing and is selectively energized in response to an input signal. The pushrod assembly is disposed in the second cavity, connected to the electric motor assembly, and rotatably driven along the longitudinal axis using output torque from the electric motor assembly. The lancet is coupled to a second end of the pushrod assembly such that translation of the pushrod assembly ultimately moves or urges the lancet toward a sealed end of the gas canister.

The housing of the axial piercing mechanism includes a second end that is configured to receive or couple to the sealed end of the canister, such that the electric motor assembly, when eventually energized, causes the pushrod assembly and lancet to translate together along the longitudinal axis toward the sealed end. Translation occurs over a distance that is sufficient for breaking, piercing, or otherwise opening an end seal or diaphragm forming the sealed end and releasing the pressurized gas from the gas canister and through the exhaust port(s) to the device, e.g., an inflatable device such as a float as set forth herein.

A system is also disclosed that includes the low-profile axial piercing mechanism and the pressurized gas canister. The system may include the device, a fitting positioned within the exhaust port(s), and tubing fluidly connecting the device to the exhaust ports.

In some embodiments, the axial piercing mechanism may include one or more pairs of jam nuts disposed at the first and/or second ends of the housing. The piercing mechanism may also include a bracket having radial standoffs received between the jam nuts.

Alternatively, a pair of the jam nuts may be disposed only at the first end, and a bulkhead attachment having an opening may receive the jam nuts and support the housing, i.e., in an orthogonal direction with respect to an orientation of the bulkhead attachment.

The above features and advantages and other features and advantages of the present disclosure are readily apparent from the following detailed description of the best modes for carrying out the disclosure when taken in connection with the accompanying drawings.

DESCRIPTION

Figure 1:
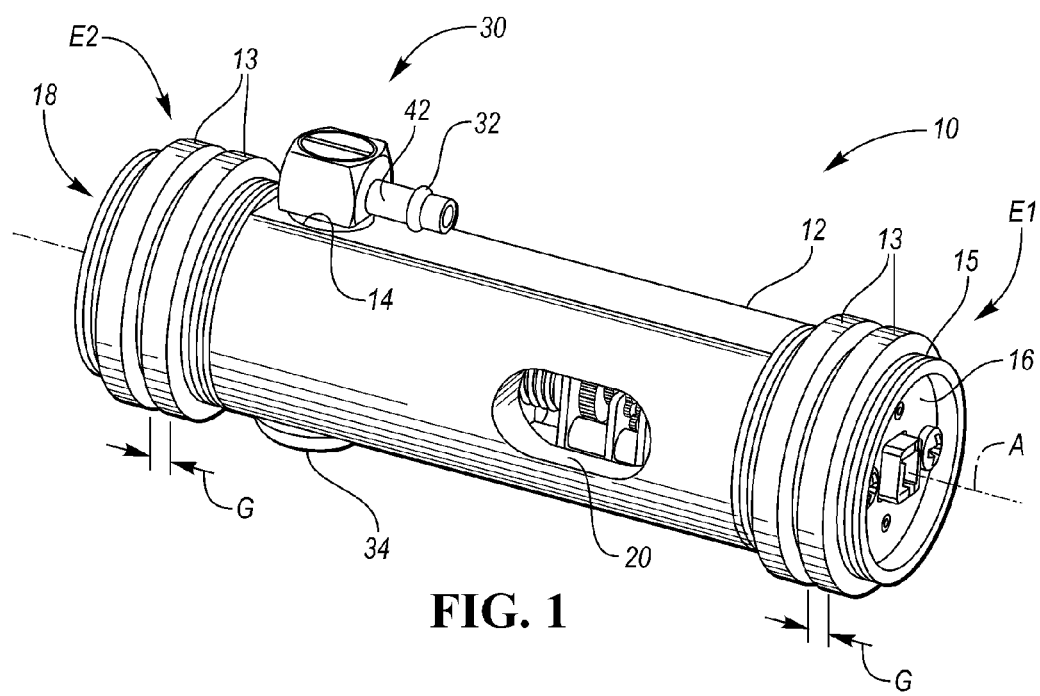
FIG. 1 is a perspective side view illustration of an example axial piercing mechanism for use with a pressurized gas canister.
Figure 3A:
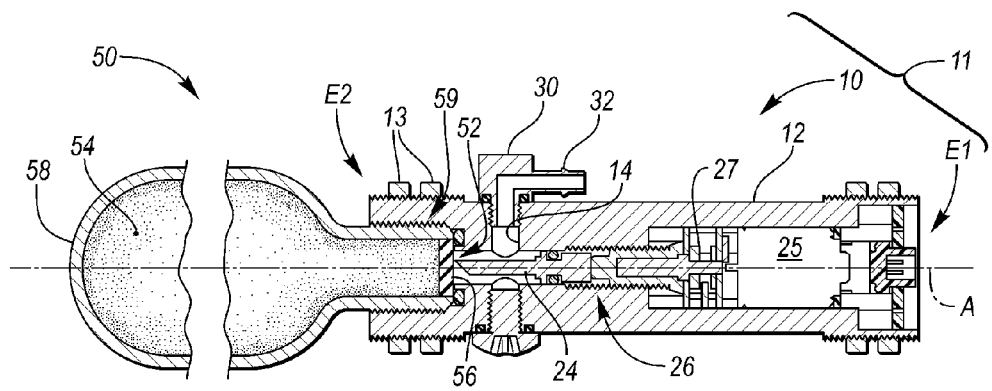
FIGS. 3A-3C are schematic cross-sectional side view illustrations of an example system that includes the axial piercing mechanism of FIGS. 1 and 2 in conjunction with a pressurized gas canister.
Figure 3B:
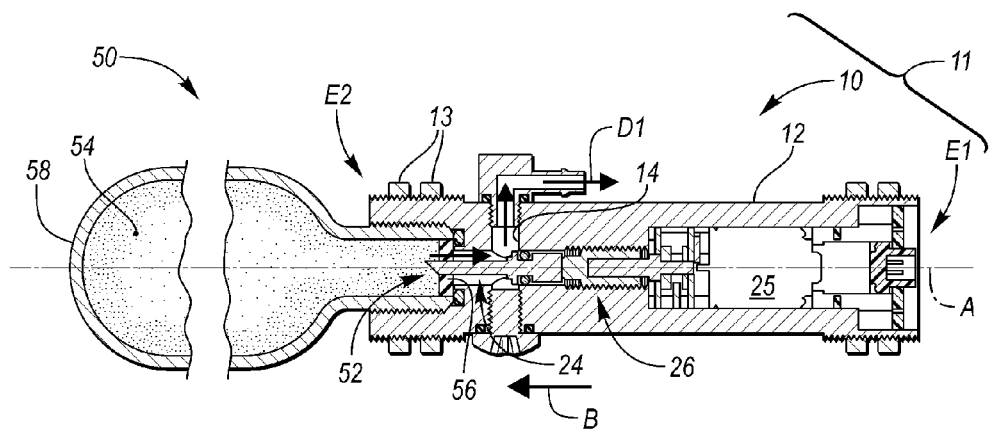
Figure 3C:
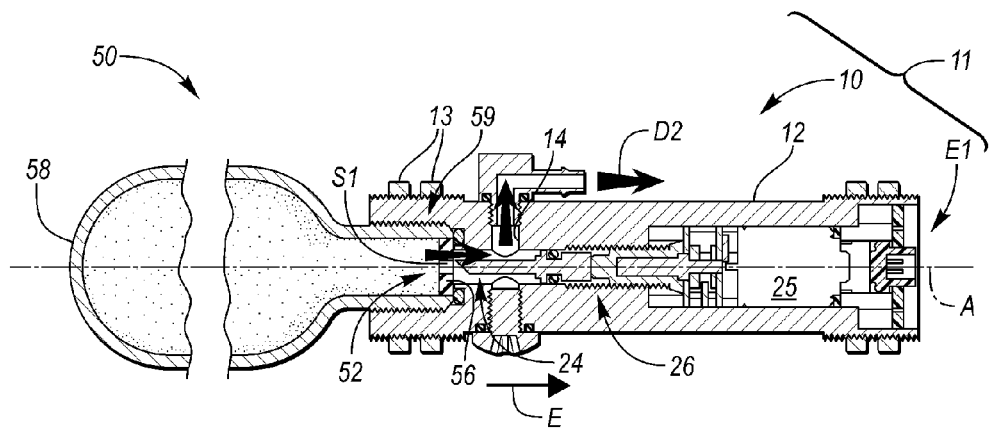
Figure 4:
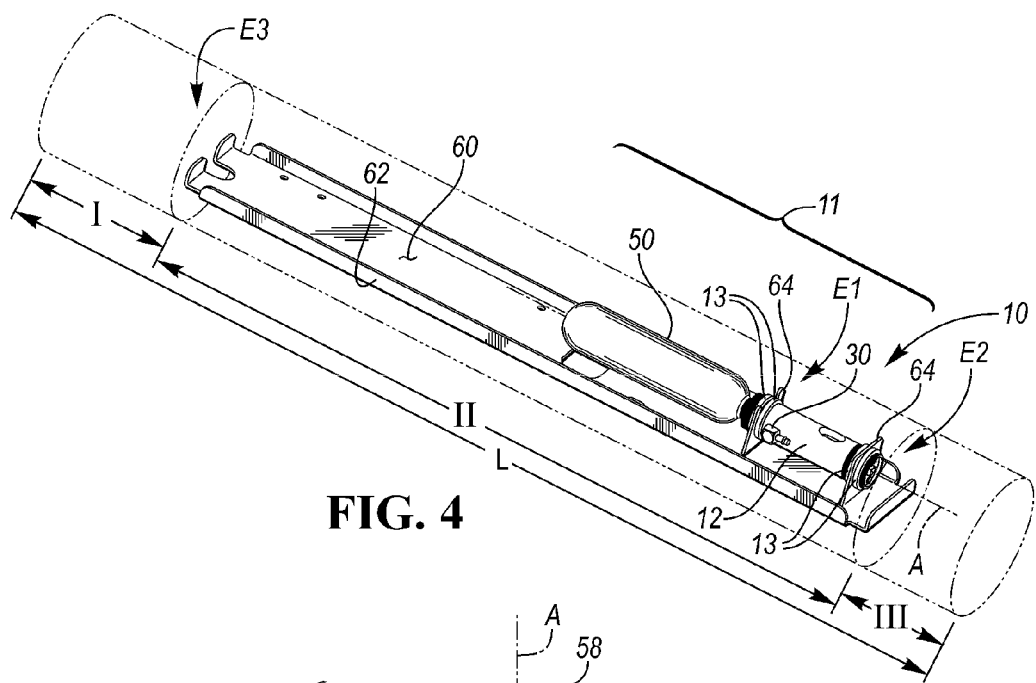
FIG. 4 is a perspective view illustration of a possible mounting embodiment for the system shown in FIGS. 3A-3C.
Figure 5:
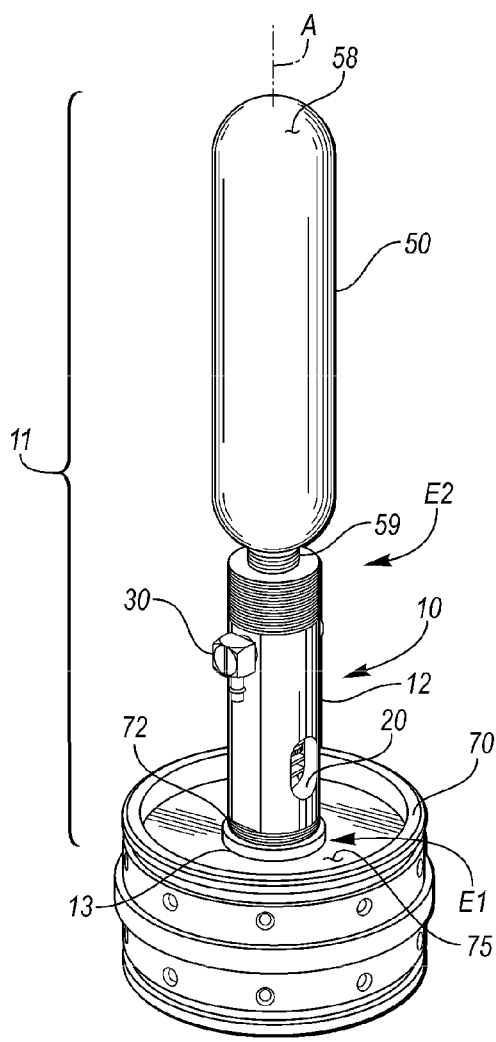
FIG. 5 is a perspective view illustration of an alternative mounting embodiment.
Figure 6:
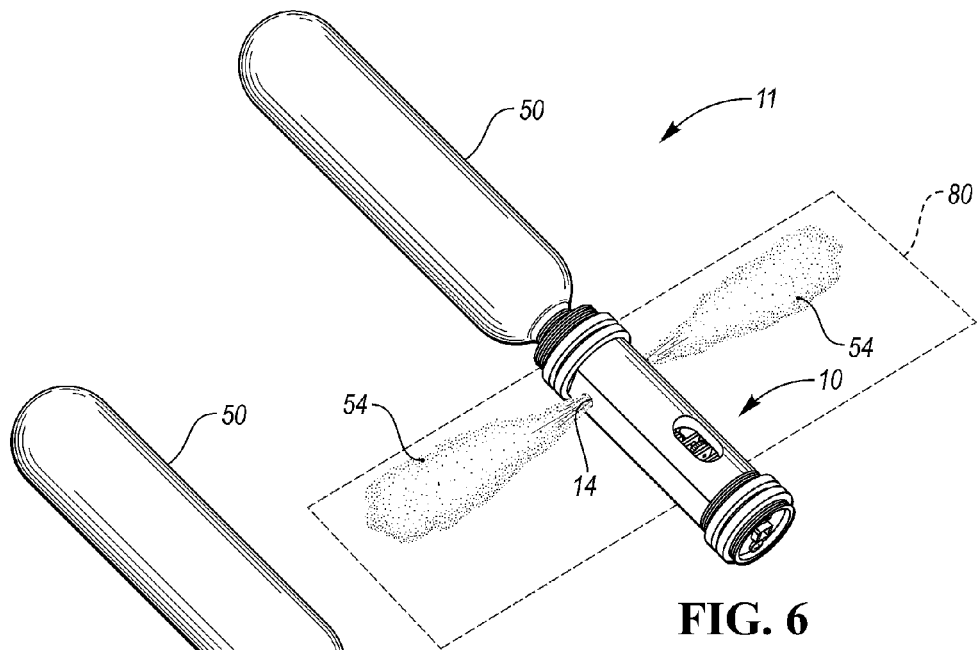
FIGS. 6 and 7 are perspective view illustrations of example exhausting embodiments of the system shown in FIGS. 3A-3C.
Figure 7:
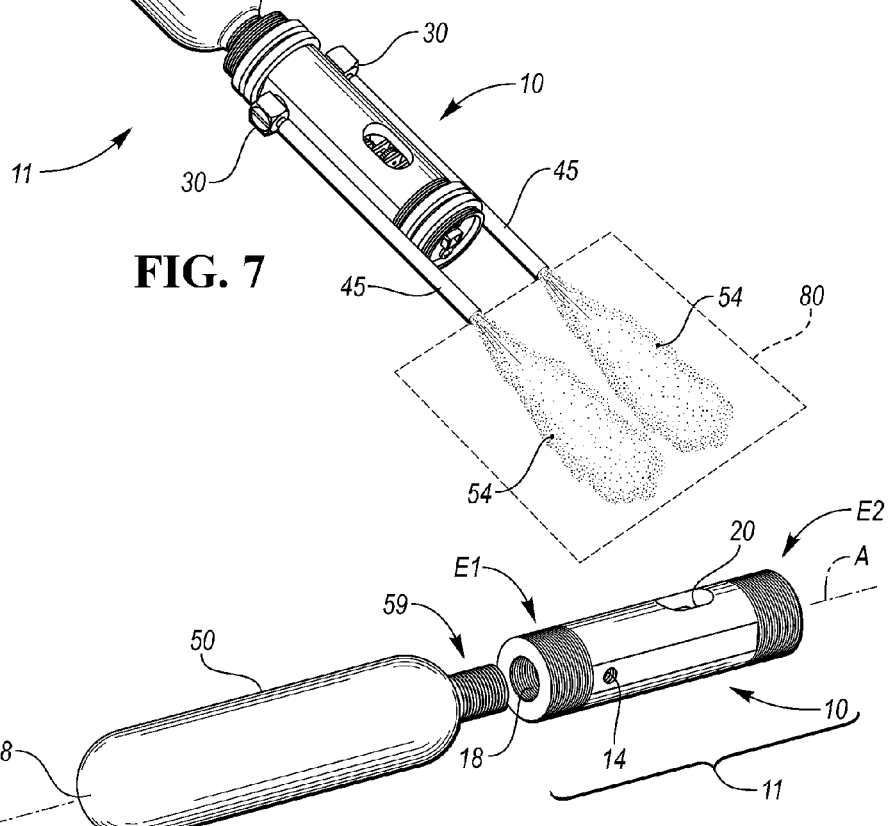

Referring to the drawings, wherein like reference numbers correspond to like or similar components throughout the several figures, a low-profile axial piercing mechanism 10 is shown in FIG. 1 that is suitable for use with a pressurized gas canister 50 having a sealed end 52, with the pressurized gas canister 50 depicted in FIGS. 3A-8 and the sealed end 52 depicted in FIGS. 3A-3C. Gas exhausted from the gas canister 50 after piercing via the axial piercing mechanism 10 may be ported into a device 80 as shown in FIGS. 6 and 7, e.g., a float for an expendable sensor, sonobuoy, or countermeasure, in which case the ported gas will cause the device 80 to inflate.

A non-limiting illustrative example application for the device 80 is that of a float, such as of a 3"×40" A-size sonobuoy, countermeasure, launcher, or other expendable device. A sonobuoy in particular is a water-born device used, in some embodiments, for passive detection of underwater acoustic signals. Upon deployment, a passive sonobuoy sinks to a calibrated depth before separating into an underwater hydrophone array and a surface electronics assembly. A float connected to the surface electronics assembly may be inflated using released gas from the gas canister 50 described herein. Inflation usually occurs upon water entry to allow the surface electronics, possibly including an RF transmitter, an antenna assembly, and control circuitry, to rise to the surface and begin relaying signals collected by the hydrophone array to a receiving station. Other sonobuoy configurations may use active rather than passive detection. While the example float application may benefit from the axial piercing mechanism 10 shown in the various Figures, other applications may be envisioned such as to provide a motive force for projectile or airframe launching, or to deliver gas as needed for manufacturing or food/beverage preparation, and therefore uses of the axial piercing mechanism 10 are not limited to inflation.

Figure 2:
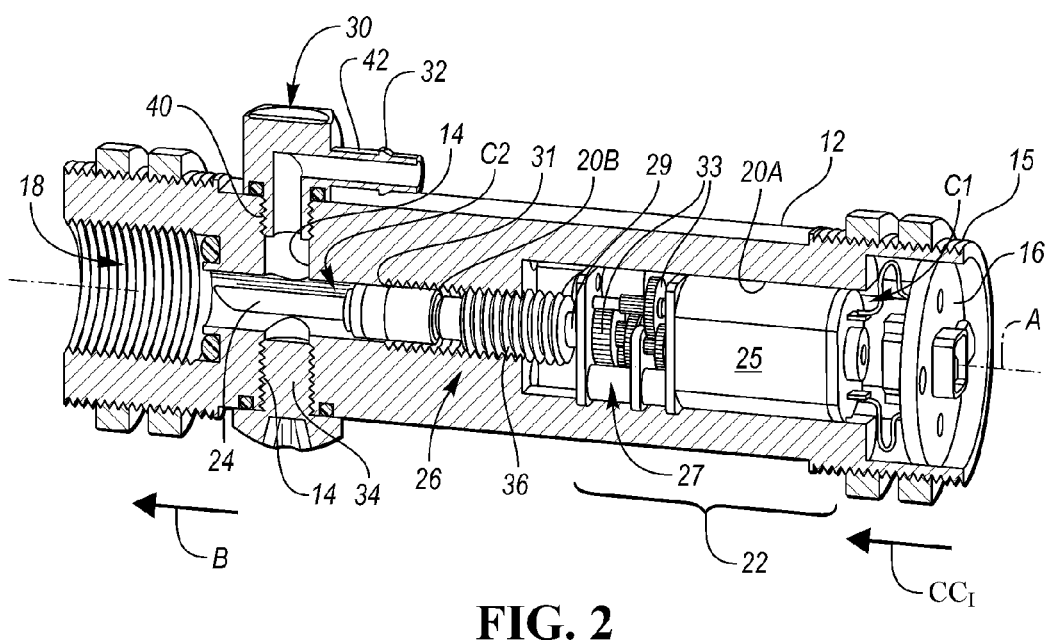
FIG. 2 is a cross-sectional side view illustration of the axial piercing mechanism shown in FIG. 1.

The axial piercing mechanism 10 includes an elongated housing 12 having a longitudinal axis (A) and defining one or more exhaust ports 14. In a possible embodiment, opposite exhaust ports 14 may extend radially outward from the longitudinal axis (A) as best shown in FIG. 2. A fitting 30 may be inserted into a corresponding one of the exhaust ports 14 to facilitate directional porting of released gas with a desired nozzle energy. For example, a swivel elbow fitting as shown in FIG. 2 may include a first arm 40 that is threaded into one of the ports 14 and a second arm 42 that extends orthogonally from the first arm 40 in a direction that is parallel to the longitudinal axis (A). When not needed, one of the exhaust ports 14 may be blanked off or closed by a threaded plug 34. The fitting 30 may have a shaped end 32 such as a conventional tube fitting or barb suitable for receiving and retaining a length of application-appropriate flexible tubing 45 as shown in FIG. 7. Such tubing 45 fluidly connects the device 80 to the exhaust ports 14.

The housing 12 of FIG. 1, which may be constructed of aluminum, composite materials, or other corrosion-resistant and lightweight materials and optionally shaped as a cylinder as shown, includes a first end E1 and a second end E2. The axial piercing mechanism 10 may include a plurality of jam nuts 13, such as two pairs of the jam nuts 13 as shown. Each jam nut 13 may be separated from an adjacent jam nut 13 by a gap (G) and positioned at the first or second ends E1 or E2. The housing 12 may be externally-threaded at one or both of the first and second ends E1 and/or E2 as shown at 15 such that the jam nuts 13 are threaded to the housing 12. Such an embodiment may facilitate use of the axial piercing mechanism 10 with a bracket 60 (FIG. 4) or a bulkhead attachment 70 (FIG. 5) as described in further detail below.

With further reference to the axial piercing mechanism 10 of FIGS. 1 and 2, the first end E1 may enclose or contain a printed circuit board assembly (PCBA) 16 and associated power/control electronics and a battery or other suitable power supply (not shown). The second end E2 is configured to receive or couple to the sealed end 52 of the pressurized gas canister 50 as shown in FIGS. 3A-8. The housing 12 may include an internally-threaded open end 18 proximate the exhaust ports 14. An optional side port 20 may be defined by the housing 12 to provide inspection access to any internal components of the axial piercing mechanism 10 as described below.

Figure 8:
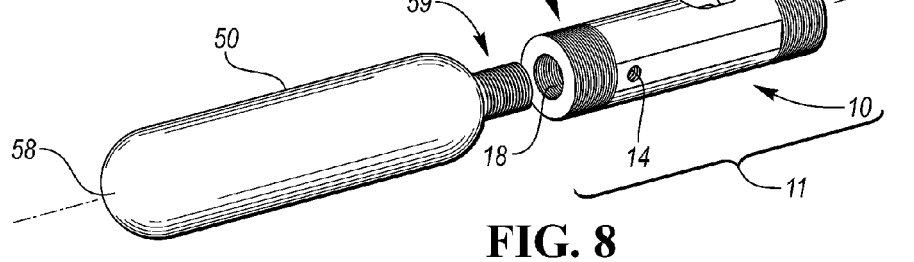
FIG. 8 is a perspective view illustration of a possible configuration for connecting a pressurized gas canister to the axial piercing mechanism described herein.

Referring briefly to FIG. 8, the pressurized gas canister 50 may include an externally-threaded end 59 and a closed end 58. The pressurized gas canister 50 thus has a single open-end design. The externally-threaded end 59 may be an integral part of the structure of the pressurized gas canister 50 as shown or it may be a separate piece, e.g., an externally-threaded collar or nut that is welded, bonded, or otherwise securely fastened to the pressurized gas canister 50. The externally-threaded end 59 is configured to thread into the internally-threaded open end 18 of the housing 12, i.e., has a mating pipe thread type and size. Thus, the axial piercing mechanism 10 and the pressurized gas canister 50 are coaxially-aligned with respect to the longitudinal axis (A) when the externally-threaded end 59 threaded into and received by the internally-threaded open end 18.

As best shown in FIG. 2, the axial piercing mechanism 10 includes internal axial walls 20A and 20B respectively defining coaxial first and second internal cavities C1 and C2. The axial piercing mechanism 10 also includes an electric motor assembly 22 and a pushrod assembly 26. The electric motor assembly 22 is disposed in the first internal cavity C1 at the first end E1 of the housing 12, while the pushrod assembly 26 in turn is disposed in the second internal cavity C2 between the electric motor assembly 22 and the first end E1. When fully retracted as shown in FIG. 2, i.e., prior to a piercing operation, the pushrod assembly 26 may extend partially into the first internal cavity C1. The PCBA 16 is configured to generate, or ultimately respond to, an input signal (arrow $CC_I$) commanding energizing of the electric motor assembly 22. For instance, a processor of the PCBA 16 may generate the input signal (arrow $CC_I$) at a particular calibrated time to close a switch between the electric motor assembly 22 and a DC battery to energize the electric motor assembly 22 in a possible embodiment, as would be appreciated by one of ordinary skill in the art. Thus, the input signal (arrow $CC_I$) may be a voltage signal, a binary on/off switching signal, or another switching or command signal suitable for turning the electric motor assembly 22 on and off as needed. The energized electric motor assembly 22 then translates the pushrod assembly 26 in an axial direction along the longitudinal axis (A) in the direction of arrow B, i.e., toward the sealed end 52 shown in FIGS. 3A-C, and to thereby linearly translate a lancet 24 toward the sealed end 52.

The electric motor assembly 22 may include an electric motor 25, e.g., a small conventional brushless or brush-type DC motor, and a gear box assembly 27 having a plurality of gear elements 33. In such an embodiment, the pushrod assembly 26 is rotatably connected to one of the gear elements 33 such that rotation of the gear elements 33 also rotates the pushrod assembly 26. The second internal cavity C2 may be internally splined as shown such that rotation of the pushrod assembly 26 causes mating splines 36 of the pushrod assembly 26 to thread into the second internal cavity C2 and translate the pushrod assembly 26 in the direction of arrow B.

The pushrod assembly 26 includes a first end 29 that is rotatably coupled to the electric motor assembly 22. The lancet 24 is coupled to a second end 31 of the pushrod assembly 26. Thus, the electric motor assembly 22, when energized, causes the pushrod assembly 26 and the coupled lancet 24 to translate along the longitudinal axis (A) for a distance sufficient for breaking or piercing the sealed end 52 of the pressurized gas canister 50 of FIGS. 3A-8 and to thereby release pressurized gas through the exhaust port(s) 14, with different possible porting configurations depicted in FIGS. 7 and 8.

Sequential operation of a system 11 having the axial piercing mechanism 10 of FIGS. 1 and 2 and a pressurized gas canister 50 is described with further reference to FIGS. 3A-3C. The pressurized gas canister 50 contains a volume of compressed gas 54, typically carbon dioxide ($CO_2$), air, or nitrogen. The pressurized gas canister 50 is sealed with a diaphragm 56 of an application-suitable sealing material to form the sealed end 52. In the stored position of FIG. 3A, the lancet 24 is positioned immediately adjacent to the sealed end 52, e.g., a couple of millimeters away so as to minimize the axial distance that the lancet 24 must translate during a piercing operation. The diaphragm 56 is intact in FIG. 3A, and thus stored compressed gas 54 is prevented from flowing through the exhaust ports 14.

In response to the input signal (arrow $CC_I$) shown in FIG. 2, the electric motor assembly 22 may be energized by applying a voltage to windings of an electric motor 25. The energized electric motor 25 begins to rotate the connected gear elements 33 of the gearbox assembly 27. Rotation of the gear elements 33 (FIG. 2) translates the pushrod assembly 26 in the direction of arrow B as shown in FIG. 3B. The lancet 24 may be embodied as a sharpened needle, a single-edged or double-edged blade, or other projection having a sufficiently sharp end and/or edge, ultimately pierces the diaphragm 56 forming the sealed end 52 of the pressurized gas canister 50. The compressed gas 54 begins to escape through the now-pierced diaphragm 56 and through the exhaust ports 14, as schematically indicated in FIG. 3B by arrow D1.

After a calibrated duration, the PCBA 16 thereafter commands a reverse in polarity of the electric motor 25 or otherwise reverses the direction of rotation of the electric motor 25 to cause the pushrod assembly 26 and the coupled lancet 24 to move away from the pressurized gas canister 50 in the direction of arrow E. The opening 51 formed in the diaphragm 56 left by the now-extracted lancet 24 allows the compressed gas 54 to flow through the pierced diaphragm 56 and through the exhaust ports 14 at a faster rate, as indicated by arrow D2 of FIG. 3C.

Referring to FIG. 4, the axial piercing mechanism 10 may be enclosed within a multi-section cylindrical outer shell having a length (L) and respective first, second, and third sections (I, II, and III). While omitted from FIG. 4 for illustrative simplicity, the first section (I) disposed at a distal end E3 of the second section (III) may enclose a battery pack having a plurality of DC battery cells providing power. The third section (III) may enclose a float, i.e., the device 80 shown schematically in FIGS. 6 and 7. The second section (II) forms an intermediate section disposed between the respective first and third sections (I and III). The second section (II) may house the axial piercing mechanism 10 and any other required control boards (not shown), with such control boards being secured to the bracket 60 of FIG. 4.

In FIGS. 4 and 5, the optional jam nuts 13 of the axial piercing mechanism 10 of FIGS. 1-3C may be used to facilitate connection of the axial piercing mechanism 10 and the pressurized gas canister 50 to the bracket 60. The bracket 60 may include elongated sidewalls 62 that are parallel to the longitudinal axis (A) of the housing 12, and that include a pair of U-shaped radial standoffs 64. The pair of radial standoffs 64 may extend orthogonally from the longitudinal member 62 and may be received between the spaced jam nuts 13 at the respective first and second ends E1 and E2 of the housing 12. The use of the swivel elbow fitting 30 allows for directed ducting of any vented gas in any rotational direction with respect to an axis of the exhaust port 14.

Alternatively, a cylindrical bulkhead attachment 70 as shown in FIG. 5 may define an opening 72, e.g., a circular opening. The jam nuts 13 may be disposed only at the first end E1 in the illustrated example embodiment, with the bulkhead attachment 70 configured to receive the pair of jam nuts 13 within the opening 72. Therefore, the longitudinal axis (A) shared by the compressed gas canister 50 and the axial piercing mechanism 10 may be oriented in a perpendicular direction with respect to a surface 75 of the bulkhead attachment 70 defining the opening 72. The embodiments of FIGS. 4 and 5 thus are intended to provide alternative mounting configurations for the axial piercing mechanism 10 into or onto adjacent sheet metal (not shown), with other mounting configurations being possible within the scope of the disclosure.

FIGS. 6 and 7 depict possible porting and venting options for the compressed gas 54 released via operation of the axial piercing mechanism 10, with a non-ported venting option depicted in FIG. 6 and a ported venting option depicted in FIG. 7. Although both exhaust ports 14 are shown as open and in use in the two example embodiments, one of the exhaust ports 14 may be sealed with the plug 34 shown in FIGS. 1 and 2, with more rapid inflation or inflation of multiple devices 80 being possible using both ports 14.

The example configuration of FIG. 6 may be used with the axial piercing mechanism 10 disposed at least partially within the device 80, in this instance an inflatable float. In such an embodiment, the released compressed gas 54 exits the exhaust ports 14 and directly enters the device 80. FIG. 7 depicts an embodiment in which the exhaust ports 14 are ported via the fittings 30 and connected tubing 45 into the device 80, with the device 80 in this example configuration positioned external to and apart from the axial piercing mechanism 10.

Using the axial piercing mechanism 10 shown in the various Figures, a low-profile configuration is enabled along the dimension of the longitudinal axis A of the axial piercing mechanism 10. The use of the disclosed electro-mechanical approach to piercing, controlled to the moment gas pressure is actually required for inflation or other purposes, thus enables longer-term storage of the axial piercing mechanism 10 together or apart from the pressurized gas canisters 50 with which the axial piercing mechanism 10 is to be used. Such a configuration eliminates the need for pre-piercing or other types of piercing devices, some of which may be less reliable after extended storage durations as noted above.

While the best modes for carrying out the disclosure have been described in detail, those familiar with the art to which this disclosure relates will recognize various alternative designs and embodiments for practicing the disclosure within the scope of the appended claims.

The invention claimed is:

1. An axial piercing mechanism for use with a canister containing pressurized gas and having a sealed end, the axial piercing mechanism comprising:
   a housing having a longitudinal axis and first and second ends, the housing defining at least one exhaust port, and further defining coaxial first and second internal cavities, wherein the second end is configured to receive or couple to the sealed end of the pressurized gas canister;
   an electric motor assembly disposed in the first internal cavity at the first end of the housing;
   a pushrod assembly disposed in the second internal cavity and having first and second ends, wherein the first end of the pushrod assembly is rotatably coupled to the electric motor assembly; and a lancet coupled to the second end of the pushrod assembly;

wherein the electric motor assembly is configured to translate the pushrod assembly and the lancet along the longitudinal axis toward the sealed end in response to an input signal to thereby pierce the sealed end and release the pressurized gas from the gas canister through the at least one exhaust port.

2. The axial piercing mechanism of claim 1, wherein the first end of the housing is internally-threaded.

3. The axial piercing mechanism of claim 1, wherein the at least one exhaust port includes a pair of exhaust ports.

4. The axial piercing mechanism of claim 1, wherein the electric motor assembly includes an electric motor and a gearbox assembly having a plurality of gear elements, and wherein the pushrod assembly is rotatably coupled to one of the plurality of gear elements.

5. The axial piercing mechanism of claim 4, wherein the second internal cavity is internally threaded, and wherein the pushrod assembly defines external threads that engage the housing within the second internal cavity.

6. The axial piercing mechanism of claim 1, further comprising:
a printed circuit board assembly configured to generate the input signal, wherein the housing contains the printed circuit board assembly at the first end.

7. The axial piercing mechanism of claim 1, wherein the first and second ends of the housing are externally-threaded, the axial piercing mechanism further comprising:
a plurality of jam nuts threaded to the housing at one or both of the first and second ends of the housing.

8. The axial piercing mechanism of claim 7, wherein the plurality of jam nuts includes a first pair of jam nuts disposed at the first end of the housing and a second pair of jam nuts disposed at the second end of the housing, the axial piercing mechanism further comprising:
a bracket having a pair of standoffs received between the jam nuts at the respective first and second ends of the housing.

9. The axial piercing mechanism of claim 7, further comprising:
a bulkhead attachment defining an opening, wherein the plurality of jam nuts includes a pair of jam nuts disposed only at the first end of the housing, and wherein the bulkhead attachment is configured to receive the pair of jam nuts in the opening.

10. The axial piercing mechanism of claim 1, further comprising:
a swivel elbow fitting having a first arm threaded into the exhaust port and a second arm, wherein the second arm is orthogonal to the first arm and is positioned in parallel with the longitudinal axis.

11. A system for delivering a compressed gas to a device, the system comprising:
a pressurized gas canister containing the compressed gas, wherein the pressurized gas canister has a sealed end that is sealed with a diaphragm; and
an axial piercing mechanism including:
a housing having first and second ends and a longitudinal axis, wherein the housing defines an exhaust port extending radially from the longitudinal axis, and further defines coaxial first and second internal cavities;
an electric motor assembly disposed in the first internal cavity at a first end of the housing and energized in response to an input signal;
a pushrod assembly disposed in the second internal cavity and having first and second ends, wherein the first end of the pushrod assembly is rotatably coupled to the electric motor assembly, and wherein the pushrod assembly is configured to be rotatably translated along the longitudinal axis via the electric motor assembly when the electric motor assembly is energized; and
a lancet coupled to the second end of the pushrod assembly;
wherein the second end of the housing is configured to receive or couple to the sealed end of the pressurized gas canister proximate the lancet such that the electric motor assembly, when energized, causes the pushrod assembly and the lancet to translate along the longitudinal axis for a distance sufficient for piercing the diaphragm and releasing the pressurized gas through the at least one exhaust port and into the device.

12. The system of claim 11, further comprising:
the device;
a fitting positioned within the exhaust port; and
tubing fluidly connecting the device to the exhaust port.

13. The system of claim 12, wherein the device is an inflatable float.

14. The system of claim 11, wherein the exhaust port includes a pair of exhaust ports.

15. The system of claim 11, wherein the electric motor assembly includes an electric motor and a gear box assembly having a plurality of gear elements, and wherein the pushrod assembly is rotatably coupled to one of the plurality of gear elements.

16. The system of claim 11, wherein the housing is internally-threaded within the second internal cavity, and wherein the pushrod assembly defines external threads that engage the housing within the internally-threaded second internal cavity.

17. The system of claim 11, further comprising:
a printed circuit board assembly configured to generate the input signal, wherein the first end of the housing contains the printed circuit board assembly and the second end of the housing receives or couples to the sealed end of the pressurized gas canister.

18. The system of claim 11, wherein the first and second ends of the housing are externally-threaded, the system further comprising:
a plurality of jam nuts threaded to the housing at one or both of the first and second ends of the housing.

19. The system of claim 18, wherein the plurality of jam nuts includes a first pair of jam nuts disposed at the first end of the housing and a second pair of jam nuts disposed at the second end of the housing, the system further comprising:
a bracket having a pair of standoffs received between the jam nuts at the respective first and second ends of the housing.

20. The system of claim 18, further comprising:
a bulkhead attachment defining an opening, wherein the plurality of jam nuts includes a pair of jam nuts disposed only at the first end of the housing, and wherein the bulkhead attachment is configured to receive the pair of jam nuts in the opening.

* * * * *